(12) United States Patent
Lui et al.

(10) Patent No.: US 11,068,841 B1
(45) Date of Patent: Jul. 20, 2021

(54) RFID ENABLED AND LOCATION AWARE PALLET MOVER

(71) Applicant: Amazon Technologies, Inc., Seattle, WA (US)

(72) Inventors: Tak Keung Joseph Lui, Bellevue, WA (US); Christopher Raymond Grajewski, Seattle, WA (US); Oleg Kantor, Kirkland, WA (US); David Bruce McCalib, Jr., Seattle, WA (US); Alton Paul Werronen, Auburn, WA (US)

(73) Assignee: Amazon Technologies, Inc., Seattle, WA (US)

( * ) Notice: Subject to any disclaimer, the term of this patent is extended or adjusted under 35 U.S.C. 154(b) by 771 days.

(21) Appl. No.: 15/617,912

(22) Filed: Jun. 8, 2017

(51) Int. Cl.
*G06Q 10/08* (2012.01)
*G06K 7/10* (2006.01)
*G06K 19/077* (2006.01)

(52) U.S. Cl.
CPC ....... *G06Q 10/087* (2013.01); *G06K 7/10366* (2013.01); *G06K 19/07773* (2013.01)

(58) Field of Classification Search
CPC .................................................. G06Q 10/087
See application file for complete search history.

(56) References Cited

U.S. PATENT DOCUMENTS

| 6,669,089 | B2 | 12/2003 | Cybulski et al. | |
|---|---|---|---|---|
| 9,007,178 | B2* | 4/2015 | Nikitin | G06K 7/10009 340/10.1 |
| 2003/0089771 | A1* | 5/2003 | Cybulski | B65D 19/00 235/385 |
| 2009/0021376 | A1* | 1/2009 | Calvarese | G06Q 10/00 340/572.1 |
| 2011/0315765 | A1* | 12/2011 | Schantz | G01S 13/751 235/385 |
| 2017/0015537 | A1* | 1/2017 | Bosworth, III | B66F 9/0755 |

* cited by examiner

*Primary Examiner* — Florian M Zeender
*Assistant Examiner* — Whitney Poffenbarger
(74) *Attorney, Agent, or Firm* — Patterson + Sheridan, LLP

(57) ABSTRACT

Embodiments presented herein describe a location aware, RFID-enabled pallet mover for tracking inventory moving in a warehouse. The pallet mover includes a RFID system for detecting a pallet currently loaded on the pallet mover and a real-time location system (RTLS) tag for identifying a location of the pallet mover in the warehouse. In one embodiment, the RFID system includes an antenna and an RFID reader for detecting RFID tags in order to track inventory such as a pallet or packages. The RFID reader can communicate with the RFID tags in the environment to identify which pallet is currently loaded on the mover. In one embodiment, the RFID system waits until the pallet mover is moving before activating the RFID reader and monitoring a received signal strength indicator (RSSI) of an RFID tag to determine whether the corresponding pallet is currently loaded onto the pallet mover.

12 Claims, 9 Drawing Sheets

RFID ENABLED AND LOCATION AWARE PALLET MOVER

BACKGROUND

Shipping warehouses can use radio frequency identification (RFID) systems to track inventory. RFID tags, which can be passive or active, are disposed on the inventory (e.g., individual packages or pallets) in the warehouse and are programmed with information identifying the associated inventory. The identifying information is read from the RFID tags by RFID readers. In one example, the RFID readers are located at loading docks or along conveyor belts so that the RFID system can detect when RFID tags (and the corresponding inventory) pass through.

Barcodes can also be used for inventory management. For example, pallets can be labeled with barcodes which are scanned by workers as the pallets move throughout the warehouse. For example, when a pallet is finished being built, a worker moves the pallet from a build location to a staging location where a barcode at the staging location and a barcode on the pallet are scanned to inform an inventory tracking system of the new location of the pallet. However, barcode reads take time and are error prone. For example, a worker can forget to scan the barcode when a pallet is moved or scan the wrong barcode. Further, even if the worker correctly scans the barcode when moving the pallet, a staging location can cover a large area which contains dozens of pallets which means the inventory tracking system does not have an accurate location of the pallet by relying only on scanning barcodes.

BRIEF DESCRIPTION OF DRAWINGS

Various embodiments in accordance with the present disclosure will be described with reference to the drawings, where like designations denote like elements.

DETAILED DESCRIPTION

Figure 1:
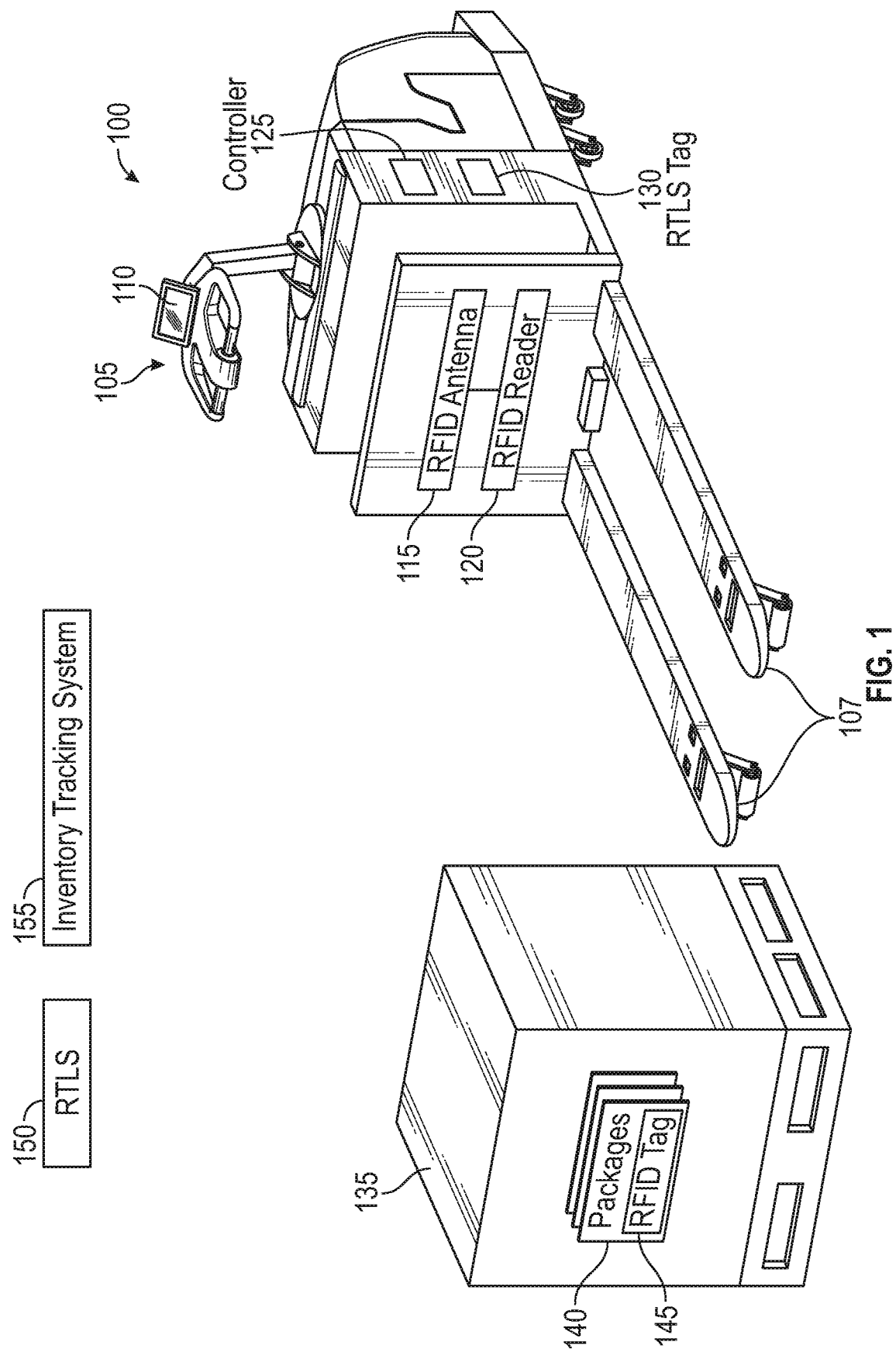
FIG. 1 illustrates a location aware, RFID-enabled pallet mover for tracking RFID tags in a warehouse, according to various embodiments.

Embodiments presented herein describe a location aware, RFID-enabled pallet mover for tracking inventory moving in a warehouse. The pallet mover (e.g., a pallet jack, powered industrial truck (PIT), or front loader) includes a RFID system for detecting a pallet currently loaded on the pallet mover. In one embodiment, the RFID system includes at least one antenna and an RFID reader for detecting RFID tags in order to track inventory such as a pallet or individual packages being carried by the pallet mover. For example, when building the pallet, a worker may place an RFID tag on the pallet. Alternatively or additionally, the individual packages on the pallet can include respective RFID tags. The RFID tags are programmed with information identifying the pallet or packages. The RFID reader on the pallet mover can communicate with the RFID tag or tags in the environment to identify which pallet/package(s) (if any) is currently loaded on the mover. In one embodiment, the RFID system waits until the RTLS indicates the pallet mover is moving before activating the RFID reader and determining whether a pallet/package(s) is loaded onto the mover. For example, the RFID system can monitor a received signal strength indicator (RSSI) of the tags while the pallet mover moves. If the RSSI remains substantially constant over time, the RFID system can determine the corresponding pallet is currently loaded onto the mover. Conversely, RSSIs that increase and decrease in strength over time are presumed to correspond to tags being passed by the pallet mover (as the pallet mover approaches a given tag, the corresponding RSSI initially increases; the RSSI then decreases once the pallet mover starts moving away from the given tag).

In addition, the location of the pallet mover (in two-dimensional or three-dimensional space) can be determined with a real-time location system (RTLS). The RTLS includes a distributed sensing array within the warehouse environment. The RTLS tag receives signals emitted by a distributed sensing array (e.g., a plurality of beacons) which a controller can use to resolve the current location of the pallet mover. By association, the location of the pallet/package(s) being carried by the pallet mover is therefore also approximately known—the identity the pallet/package(s) having been determined by the RFID system. The location of the pallet/package(s) may be resolved with greater precision according to other embodiments disclosed herein. For example, in one embodiment, the pallet mover uses a distance sensor to determine an offset distance between the pallet mover and the pallet/package(s) which enables the RTLS to identify an accurate location of the pallet/package(s) in the warehouse (e.g., within a meter or less). Once the RFID system determines that the pallet mover has dropped off the pallet, the current location of the pallet can be reported to the inventory tracking system.

Provisioning a pallet mover with an RFID system and an RTLS tag enables the inventory tracking system to identify a real-time and accurate location of inventory throughout the transport cycle carried out by the pallet mover. The inventory tracking system can use the location of the pallet to provide real-time feedback to the worker. For example, the inventory tracking system can provide a map to the worker indicating a location of the pallet which the worker is assigned to move. Further, if the worker drops the pallet off at the wrong destination (e.g., at the wrong loading dock) or retrieves the wrong pallet, the inventory tracking system can identify the error and inform the worker.

FIG. 1 illustrates a location aware, RFID-enabled pallet mover 105 for tracking RFID tags 145 in a warehouse 100, according to various embodiments. The pallet mover 105 (e.g., a PIT or a pallet jack) includes an RFID reader 120 coupled to at least one RFID antenna 115. The RFID antenna 115 is arranged on the pallet mover 105 to read the RFID tags 145 on a pallet 135. In one embodiment, when the pallet 135 is loaded onto forks 107 (i.e., support members for lifting and carrying the pallet 135), the RFID reader uses the antenna 115 to transmit RFID signals to the RFID tags 145 which, in reply, transmit RFID responses which contain IDs uniquely identifying the tags 145. In the embodiments that follow, it is assumed that the pallet 135 includes multiple packages 140, each including at least one RFID tag 145. However, in other embodiments, the packages are not provisioned with RFID tags and only the pallet 135 includes an RFID tag 145.

The RFID tags 145 can be passive or active tags. If passive, the RFID tags 145 use the RFID signals emitted by the antenna 115 to power their internal components (e.g., a modulator) in order to transmit RFID responses which include the encoded IDs to the antenna 115 and the RFID reader 120. Put differently, a passive RFID tag does not need an internal battery but instead uses the incident RFID signals to transmit a response that includes its ID to the RFID reader 120. An active RFID tag, in contrast, includes a power supply which can be used to operate its internal components such as a receiver or modulator. Although passive RFID tags are typically less expensive, active RFID tags can be sensed at greater ranges. In one embodiment, the active RFID tags transmit their corresponding ID after receiving the RFID signals transmitted by the antenna 115. However, in another embodiment, the active RFID tags function as beacons where the tags constantly transmit their IDs.

The pallet mover 105 includes a controller 125 that includes hardware, software, or a combination of both, and which is communicatively coupled to the RFID reader 120 and receives the tag IDs detected by the reader 120. The controller 125 can relay this information to an inventory tracking system 155 so that this system 155 can track the location of the pallet 135 in the warehouse 100. For example, using the RFID signals measured by the RFID reader 120, the controller 125 can inform the inventory tracking system 155 when the pallet 135 is picked up and when the pallet 135 is dropped off by the pallet mover 105. Further, the controller 125 can indicate the particular RFID tags 145 on the pallet 135 which the inventory tracking system 155 can use to confirm whether the pallet 135 includes the intended packages 140—i.e., that the pallet 135 was assembled correctly. In one embodiment, the controller 125 includes a wireless communication interface for communicatively coupling the pallet mover 105 to the inventory tracking system 155.

The pallet mover 105 also includes an RTLS tag 130 which can receive signals from a RTLS 150 that enables the controller 125 to identify a precise location of the pallet mover 105 in the warehouse 100. In one embodiment, the RTLS 150 and the RTLS tag 130 uses an ultra-wide band (UWB) radio standard to communicate and can achieve 5-30 cm accuracy at distance of one kilometer. Using time-of-flight, the controller 125 can determine the relative distance between the RTLS tag 130 and transmitters (e.g., beacons) in the RTLS 150 disposed in the warehouse. However, in other embodiments, the RTLS 150 and RTLS tag 130 can use other types of location services such as Wi-Fi or other narrow band communication technique.

In one embodiment, the controller 125 reports the location derived from the signals received from the RTLS tag to the inventory tracking system 155 which uses that location to determine whether the pallet mover 105 is interacting with the correct pallet 135 for pickup or drop off at the correct location. In addition, the controller 125 can use the determined RTLS tag 130 location to determine when the pallet mover 105 is moving, and in response, activate the RFID reader 120 and monitor the RSSIs (or other type of RFID distance indicator) corresponding to the RFID tags 145 to determine whether the corresponding package is loaded onto the forks 107. A relatively stable RSSI while the pallet mover 105 is moving indicates that the corresponding package is being carried by the pallet mover.

The pallet mover 105 includes a display 110 which is viewable by the operator. In one embodiment, the inventory tracking system 155 transmits feedback or instructions to the controller 125 for the operator. The controller 125 can visually output this feedback or instructions using the display 110. For example, if the inventory tracking system 155 wants the operator to move the pallet 135 to the staging area for a particular loading dock but the operator dropped the pallet 135 off at the wrong staging area, the inventory tracking system 155 can use the display to alert the operator of the mistake. In another example, when requesting the operator to move the pallet 135 onto a truck, the inventory tracking system 155 can use the display 110 to provide a map of a staging area containing multiple pallets and indicate to the operator which of the pallets should be moved onto the truck.

Figure 2:
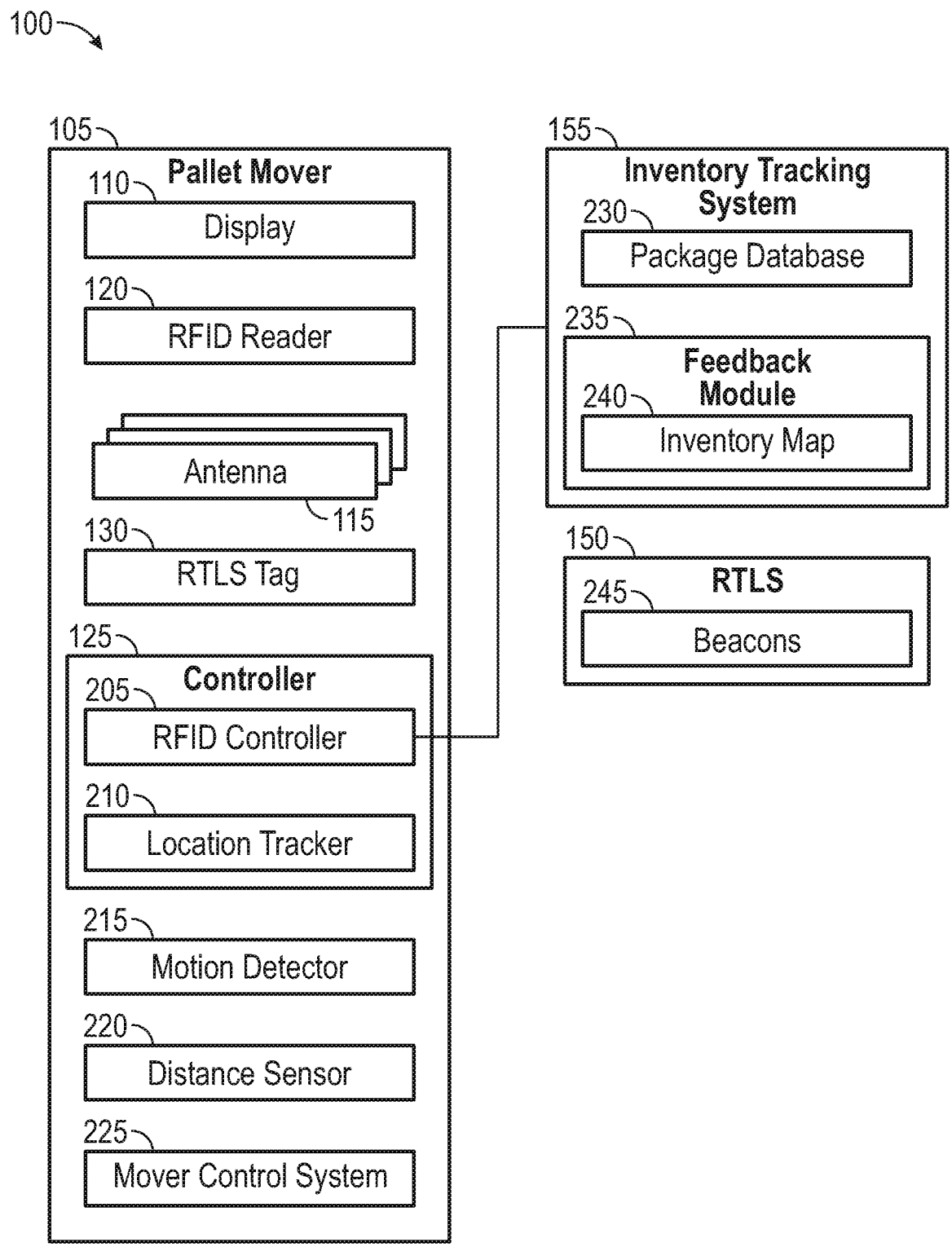
FIG. 2 is a block diagram of a system used to track inventory in a warehouse, according to various embodiments.

FIG. 2 is a block diagram of a system used to track inventory in the warehouse 100, according to various embodiments. The warehouse 100 includes the pallet mover 105, the inventory tracking system 155 and the RTLS 150. As shown, the controller 125 in the pallet mover 105 includes an RFID controller 205 and a location tracker 210 which can include hardware components, software modules, or combinations thereof. The RFID controller 205 is communicatively coupled to the antenna 115 and the RFID reader 120 and controls their function. For example, the RFID controller 205 can activate and deactivate the RFID reader 120 (e.g., turn off and on a transceiver in the reader 120) to control when the antenna 115 emits and receives RFID signals. In one embodiment, the RFID controller 205 maintains the RFID reader 120 in an inactive state until the pallet mover 105 begins to move in order to, e.g., conserve battery life and prevent the RFID reader 120 from emitting signals that could interfere with other RFID systems in the warehouse 100. The RFID controller 205 can evaluate the RFID responses received from RFID tags to determine what tags are proximate to the pallet mover 105. In one embodiment, the RFID controller 205 evaluates signal metrics corresponding to the RFID tags such as signal strength, RSSI, or other type of distance indicator in order to determine which RFID tags in the warehouse 100 are currently loaded onto the pallet mover 105 and which are not.

The RFID controller 205 is also wireless communicatively coupled to the inventory tracking system 155 in order to inform the system 155 when a pallet (and the corresponding packages) is picked up and dropped off by the pallet mover 105. The inventory tracking system 155 includes a package database 230 which can store information concerning the packages in the warehouse 100. For example, the package database 230 may map each package in the warehouse 100 to a unique tag ID. When the package is built into a pallet, the inventory tracking system 155 can update the package database 230 to reflect which pallet contains the package. Using the information provided by the RFID controller 205, the package database 230 can also indicate the precise location of the pallet.

The inventory tracking system 155 also includes a feedback module 235 which can use the information in the package database 230 to provide feedback or instructions to the operator of the pallet mover 105. For example, if the operator should have moved the pallet to Loading Dock A but instead moved the pallet to Loading Dock B, the feedback module 235 can identify this mistake by monitoring the location of the pallet in the package database 230 and inform the operator of the mistake by communicating with the RFID controller 205, which in turn, can output an alert to the operator using the display 110. In another example, when building the pallet, a worker may have omitted a package from the pallet or put in the pallet a package that should have been placed in a different pallet. Once the RFID controller 205 updates the package database 230 to indicate what packages are in the pallet currently loaded onto the pallet mover 105, the feedback module 235 can evaluate the package database 230 to ensure all the correct packages are in the pallet. If not, the feedback module 235 can use the display 110 to instruct the operator to take a corrective action such as moving the pallet to a designated area where a supervisor can inspect the pallet.

The feedback module 235 can include hardware or software components. The feedback module 235 generates an inventory map 240 using the location information of the pallets and packages stored in the package database 230. By tracking the location of the pallets using the pallet mover 105, the inventory map 240 can provide a location of all the pallets in the warehouse 100. In one embodiment, the map 240 is interactive such that an operator can use the display 110 to zoom and select different portions of the map 240 to identify the location of the pallets in the warehouse 100.

The RTLS 150 includes multiple beacons 245 disposed in the warehouse 100. The beacons 245 can be disposed at various locations in the warehouse 100 to communicate with the RTLS tag 130 as the pallet mover 105 changes locations in the warehouse 100. In one embodiment, the signals received by the RTLS tag 130 are transmitted to the location tracker 210 which determines a location of the pallet mover 105 in the warehouse. The location tracker 210 can monitor its current location to determine when the pallet mover 105 is moving or is stationary and report this information to the RFID controller 205.

The pallet mover 105 also includes a motion detector 215 which can determine when the pallet mover 105 (or a portion thereof) is moving. For example, the motion detector 215 can be an accelerometer disposed on a portion of the pallet mover 105 that moves when picking up or dropping off a pallet, such as the forks. If the pallet mover 105 is a pallet jack, the motion detector 215 can be disposed on a lever or handle which is pumped up and down in order to lift the pallet. In one embodiment, the RFID controller 205 can use a signal outputted by the motion detector 215 to determine when a pallet is being picked up or dropped off.

In another embodiment, the location tracker 210 uses the motion detector 215 to determine an orientation of the pallet mover 105. With this information, the location tracker 210 can determine a relative distance between the RTLS tag 130 (which represents the location of the pallet mover 105) and the pallet. For example, if the location tracker 210 knows the pallet mover 105 is facing North, the location tracker 210 can add a fixed offset representing the distance between the RTLS tag 130 in the pallet in that direction to determine a more accurate location of the pallet in the warehouse 100.

The pallet mover 105 also includes a distance sensor 220 which determines a separation distance between a fixed location on the pallet mover 105 where the sensor 220 is mounted and a pallet loaded onto the forks of the mover 105. For example, the distance sensor 220 may be a depth sensor (e.g., a time of flight sensor) that measures the distance from the point where the forks couple to the pallet mover 105 (which is where the distance sensor 220 is affixed) and the pallet that is loaded onto the forks. In one embodiment, the location tracker 210 uses the distance measured to determine the offset distance between the pallet and the RTLS tag 130 in order to report a more accurate location of the pallet to the inventory tracking system 155.

The pallet mover 105 includes a mover control system 225 which controls the actions of the mover 105 such as steering the pallet mover 105, picking up and dropping off the pallets, and controlling the internal mechanisms in the pallet mover 105 (e.g., the propulsion system, pneumatic systems, stability systems, safety systems, and the like). In one embodiment, the mover control system 225 may function independent of the other components in the pallet mover 105 shown in FIG. 2. Stated differently, the components in the pallet mover 105 used to perform RFID sensing and location tracking of the pallets can be separate from the mover control system 225. One advantage of doing so is that the components shown in FIG. 2 can be added to the pallet mover 105 to track the contents and location of the pallets without changing the mover control system 225. However, in other embodiments, the mover control system 225 can interface with the controller 125 used to control the RFID and location systems in the pallet mover 105. For example, the mover control system 225 may inform the RFID controller 205 when the operator has pressed a button which raises or lowers the forks thereby indicating when a pallet is being picked up or dropped off. But this is not required since the RFID controller 205 can determine this information using the motion detector 215 or by the information received from the RFID reader 120.

Figure 3A:
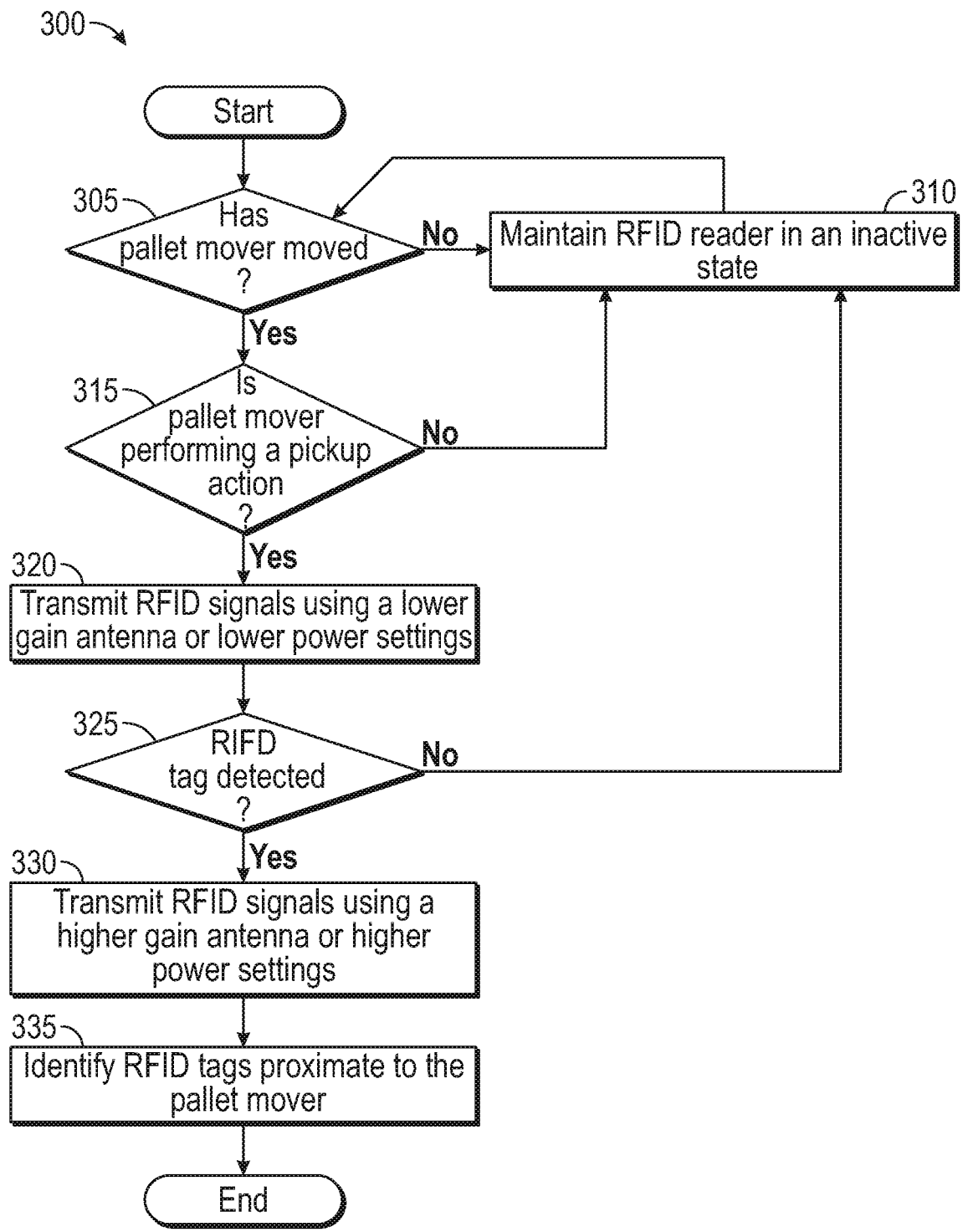
FIG. 3A is a flow chart for activating an RFID reader on a pallet mover, according to various embodiments.

FIG. 3A is a flow chart of a method 300 for activating an RFID reader on a pallet mover, according to various embodiments. At block 305, the RFID controller determines if the pallet mover has moved. In one embodiment, the RFID controller waits to activate the RFID reader until the pallet mover has begun to move. For example, the RFID controller may deactivate the RFID reader after the pallet mover has remained stationary for a threshold period of time without the operator raising or lowering the forks, thereby indicating that the pallet mover is not currently being used to move a pallet. Thus, in FIG. 3A, waiting until the pallet mover begins to move serves as a threshold to determine when to activate the RFID reader.

In one embodiment, the RFID controller uses the location information detected by the location tracker to determine whether the pallet mover has moved. The location tracker may at intervals (e.g., several times a second) determine the current location of the RTLS tag on the pallet mover. If the current location changes according to a threshold, the location tracker can inform the RFID controller. However, if the location does not change, the RFID controller knows the pallet mover is stationary.

In another embodiment, the RFID controller can use the motion detector mounted on the pallet mover to determine motion. For example, the motion detector may be an accelerometer disposed on a portion of the pallet mover that only moves if the entire machine moves (in contrast to a motion detector that is mounted on an actuator such as a handle which can be adjusted without moving the entire pallet mover).

If the pallet mover does not move, the method 300 proceeds to block 310 where the RFID controller maintains the RFID reader in an inactive state. In one embodiment, when inactive, the RFID reader does not emit RFID signals. Doing so can conserve battery life or fuel used to power the RFID reader. Moreover, the RFID reader does not unnecessarily emit RFID signals which can cause interference for other RFID systems in the warehouse which are actively attempting to identify RFID tags.

If, however, the pallet mover has moved, the method 300 proceeds to block 315 where the RFID controller determines if the pallet mover performs a pickup action to load a pallet onto its forks. In one embodiment, the RFID controller identifies a pickup action by monitoring the motion detector mounted on the pallet mover. For example, the motion detector can be mounted on a portion of a PIT that raises and lowers when the operator picks up a pallet. The motion detector can be an accelerometer which measures an upward acceleration when the PIT raises its forks to lift a pallet. In another example, the motion detector can be mounted on a lever of pallet jack which the operator uses to lift a pallet. In one embodiment, the RFID controller may use the motion detector to identify when the operator has lowered and raised the lever several times since it may require several pumps before the pallet is loaded onto the forks.

In another embodiment, the RFID controller is communicatively coupled to the mover control system. Thus, when the operator presses a button or switch on the pallet mover which lifts up the forks to load a pallet, the mover control system informs the RFID controller that the operator is performing a pickup action. In this embodiment, the motion sensor may not be required since the RFID controller is informed of the pickup action by the mover control system.

If the pickup action is not detected, the method 300 proceeds to block 310 where the RFID controller maintains the RFID reader in an inactive state. However, if the pickup action is detected, the method 300 proceeds to block 320 where the RFID controller instructs the RFID reader to transmit RFID signals using a lower gain antenna or lower power settings. Stated differently, in one embodiment, the RFID system on the pallet mover includes at least two RFID antennas (but can have more than two) where one of the antennas has a lower gain or smaller beam pattern than the other antenna. As a result, the RFID signals transmitted using the lower gain antenna results in a smaller transmission radius. In one embodiment, the gain of the antenna used at block 320 may limit the beam pattern to less than one meter, or less than 50 cm. In one embodiment, the beam pattern of the lower gain antenna may not extend through an entire pallet when loaded onto the pallet mover which can have a width and a length of less than 120 cm. In addition, although the lower gain antenna may have a radius that does not extend through the pallet, the radius is sufficient to detect at least one RFID tag when a pallet is loaded onto the pallet mover. In one embodiment, detecting only a handful of the RFID tags in the pallet using the lower gain antenna can enable the RFID controller to confirm that there is a pallet loaded onto the forks. That is, if the beam pattern used at block 320 is controlled such that the pattern covers only the location occupied by a pallet when loaded onto the pallet mover, then anytime a tag is detected at block 320 this means a pallet has been loaded onto the pallet mover. However, in other embodiments, RFID controller may wait to decide if there is a pallet loaded onto the pallet mover if, for example, the beam pattern cannot be tightly controlled to ensure the RFID reader did not read a tag at block 320 that is not loaded onto the mover.

In another embodiment, instead of using multiple antennas, the RFID reader may use lower power settings to operate the RFID antenna during block 320. In this example, the RFID reader can transmit less power to the RFID antenna to limit the radius of the beam pattern corresponding to the antenna. As a result, the beam pattern of the RFID antenna may be limited to less than one meter or less than 50 cm, and as a result, may not extend through a pallet. Nonetheless, detecting only a few of the RFID tags in the pallet using the lower power settings enables the RFID controller to confirm that the pallet has been loaded onto the forks. One advantage of using lower power settings for the antenna is to preserve battery life and limit the RFID interference the emitted signals may cause on other RFID systems in the warehouse.

In one embodiment, the RFID controller decides that a pallet is loaded onto the pallet mover if the RFID read identifies an RFID tag when transmitted using the low gain antenna or the lower power settings. If at block 325 the RFID controller does not detect at least one RFID tag using the lower gain antenna or the lower power settings, the method 300 proceeds to block 310 where the RFID reader is switched to the inactive state—i.e., the RFID reader stops emitting RFID signals since a pallet was not loaded onto the forks. For example, the operator may have performed the pickup action at block 315 to test the operation of the pallet mover or to lift the forks above an obstacle but did not load a pallet onto the pallet mover.

If at block 325 the RFID controller detects at least one RFID tag, the method 300 proceeds to block 330 where the RFID controller instructs the RFID reader to transmit RFID signals using a high gain antenna or higher power settings. In one embodiment, the RFID reader emits RFID signals using an RFID antenna with a higher gain than the antenna used at block 320. For example, the radius of the beam pattern of this antenna may extend through the pallet—e.g., a radius greater than 120 cm. In one embodiment, the radius of the beam pattern may extend through at least two pallets since some pallet movers can carry two pallets onto the forks at the same time.

In another embodiment, instead of having multiple antennas, the RFID reader can use higher power settings to increase the radius of the beam pattern of the same antenna used at block 320. As above, the higher power settings may increase the radius such that the entire pallet (or multiple pallets) is included within the beam pattern so that the RFID reader can detect all the RFID tags in the pallet. Because of the amount power that may be used to penetrate through the pallet, the beam pattern of the antenna may extend beyond the pallet and include neighboring pallets that are not loaded onto the pallet mover. Put differently, at block 330, the RFID reader may detect RFID tags on the pallet loaded onto the forks as well as RFID tags corresponding to other pallets proximate to the pallet mover.

Figure 3B:
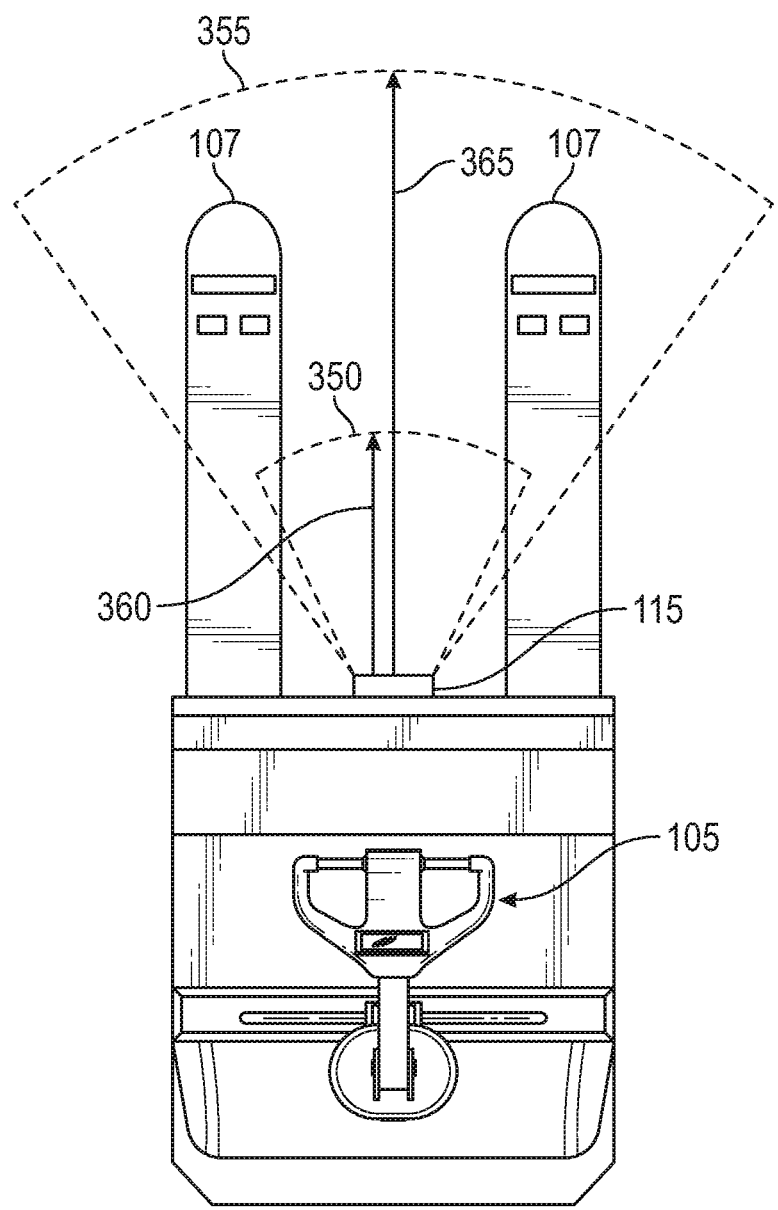
FIG. 3B is a top view of a pallet mover using two different beam patterns, according to various embodiments.

FIG. 3B is a top view of the pallet mover 105 using two different beam patterns, according to various embodiments. As shown, the RFID antenna 115 emits a first beam pattern 350 and a second beam pattern 355. The first beam pattern 350 has an area and a first radius 360 that is smaller than the area and a second radius 365 of the second beam pattern 355. In one embodiment, the first beam pattern 350 corresponds to the beam pattern of the antenna when the RFID reader uses lower power settings at block 320 of method 300, while the second beam pattern 355 corresponds to the beam pattern of the antenna when the RFID reader uses high power settings at block 330. In another embodiment, instead of using the same antenna, the pallet mover 105 could have a lower gain antenna that establishes the first beam pattern 350 and a higher gain antenna that establishes the second beam pattern 355.

In one embodiment, instead of using multiple antennas with different gains, or switching between lower and higher power settings, after a pickup action is detected at block 315, the RFID controller instructs the RFID reader to emit RFID signals with sufficient signal strength to detect any RFID tag that is on a pallet loaded onto the forks. For example, a single RFID tag may be placed on the pallet rather than the packages in the pallet containing their own RFID tags. In that scenario, the pallet may be loaded on the pallet mover such that the RFID tag is on a side of the pallet facing away from the pallet mover. As such, the RFID signals emitted by a lower gain antenna or using lower power settings may be unable to penetrate the pallet and trigger the RFID tag. Accordingly, after block 315, the RFID reader can emit signals sufficient to penetrate through the pallet in order to detect an RFID tag regardless where the tag is disposed on the pallet.

Returning to method 300, at block 335, the RFID controller identifies RFID tags proximate to the pallet mover. In one embodiment, the RFID controller generates a list of the RFID tags detected at blocks 320 and 330. However, this list may include RFID tags that are on the loaded pallet as well as RFID tags that are on pallets not loaded onto the pallet mover but are still within range of the RFID signals emitted by the antenna. As mentioned above, the RFID signals may have sufficient strength to penetrate through the pallets in order to identify the RFID tags on the pallets. As a result, the RFID signals may extend beyond the pallet or pallets loaded onto the pallet mover and can strike RFID tags disposed on other pallets. Thus, the RFID reader can detect RFID tags that are not on the pallet mover. In one embodiment, the RFID controller waits to report to the inventory tracking system which RFID tags are loaded onto the pallet mover until the RFID controller can determine which of the RFID tags in the list are loaded onto the pallet mover and which are in neighboring pallets.

In another embodiment, the RFID controller sends the list to the inventory tracking system before determining which of the RFID tags in the list are loaded onto the pallet mover. The inventory tracking system can use the list as a preliminary indicator of the RFID tags on the pallet mover. Because at a minimum the list should include the RFID tag or tags loaded onto the pallet mover, the inventory tracking system can cross check the list with the RFID tags the inventory tracking system expects to be loaded onto the pallet mover. Put differently, the inventory tracking system already knows which pallet (and the corresponding RFID tags) that the operator should have loaded onto the pallet mover. If the preliminary list sent by the RFID controller at block 335 does not include some or all of those RFID tags, the inventory tracking system can provide feedback to the operator informing her that she has picked up the incorrect pallet. That is, although the list can include RFID tags which are not intended to be moved, the list should at least include one RFID tag that is intended to be moved by the pallet mover. If not, the inventory tracking system can inform the RFID controller. In turn, the RFID controller can use the display mounted on the pallet mover to inform the operator of the mistake and provide instructions for a remedial action such as indicating the location of the correct pallet or asking the operator to confirm she picked up the correct pallet.

Although FIG. 3 illustrates detecting a pickup action at block 315 and transmitting RFID signals using a low gain beam pattern, in another embodiment, the method 300 may perform only one of these actions. For example, if a pickup action is detected, the method 300 may skip to block 330 for transmitting RFID signals using the higher gain antenna or higher power settings. Alternatively, the RFID controller may constantly (or at intervals) activate the lower gain antenna or use the lower power settings to operate the RFID reader to detect if a pallet has been loaded onto the mover without waiting to detect a pickup action.

Figure 4:
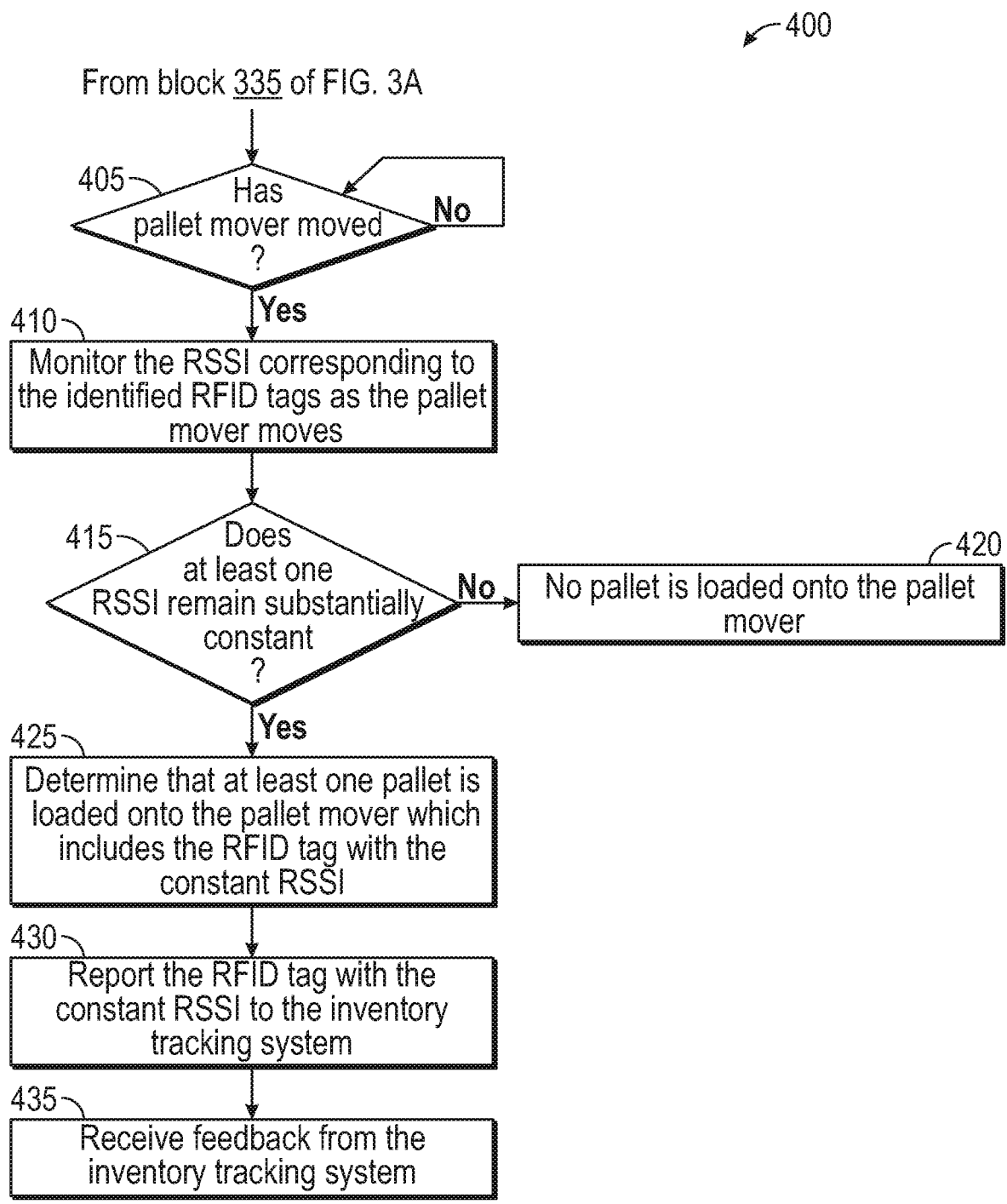
FIG. 4 is a flow chart for determining if a pallet is loaded onto a pallet mover, according to various embodiments.

FIG. 4 is a flow chart of a method 400 for determining if a pallet is loaded onto a pallet mover, according to various embodiments. The method 400 begins after block 315 of FIG. 3A has completed and the RFID controller has identified RFID tags proximate to the pallet mover. At block 405, the RFID controller determines if the pallet mover has moved. In one embodiment, the RFID controller relies on the location tracker to determine when the pallet mover has moved using the RTLS tag. In one embodiment, the location tracker monitors the motion sensor (e.g., an accelerometer) to determine when the pallet mover has moved. However, in another embodiment, the location tracker uses the signals received from the RTLS tag to constantly, or at intervals, identify a current location of the pallet mover. The location tracker can monitor the location of the pallet mover and determine when the pallet mover has moved or is currently moving. In one embodiment, the location tracker uses a predefined threshold to determine when the pallet mover has moved. For example, if the current location differs from the previously calculated location by at least 10 cm. In another example, the location tracker may monitor changes in the average location over time. For instance, the location tracker may compare the average location of the pallet mover during a five second time period to the average location of the pallet mover during the next five second time period and determine if the difference of the averages exceeds the threshold. If so, the location tracker informs the RFID controller that the pallet mover has moved.

After determining the pallet mover has moved, at block 410, the RFID controller monitors the RSSI corresponding to the identified tags as the pallet mover moves in the warehouse. In one embodiment, the RFID controller performs block 410 only when the pallet mover is moving in the warehouse. If the location tracker determines the pallet mover stops, the RFID controller may stop monitoring the RSSI.

In one embodiment, the RFID controller monitors the RSSI to determine which of the RFID tags identified in the list generated at block 335 in FIG. 3A are loaded onto the pallet mover. That is, the list can include RFID tags that are in proximate pallets that are not loaded onto the pallet mover. If the RFID tag is loaded onto the pallet mover, then as the pallet mover moves, the RSSI corresponding to the tag (or an average of the RSSI over time) remains substantially constant. That is, the physical distance between the RFID tag loaded onto the pallet mover and the RFID antenna mounted on the pallet mover remains fixed as the pallet mover moves. Thus, the RSSI remains substantially unchanged although there can be temporally fluctuations in the RSSI due to the changing environment around the RFID antenna as the pallet mover moves—i.e., the RSSI can have a dip or spike. However, measuring an average of the RSSI over time can reduce the effect of these fluctuations.

In contrast, the RFID tags identified in the list that are not on the pallet mover have RSSIs that change as the pallet mover moves in the warehouse. That is, the physical distance between the RFID antenna on the pallet mover and the RFID tags changes as the pallet mover moves. As such, the RSSI does not remain substantially constant. For example, the RFID controller can detect a change in the average RSSIs for the RFID tags that are not on the pallet mover. In one embodiment, the RFID controller can use a predefined threshold (e.g., a change of 10% or more) to determine when the change in the average RSSI is significant enough to indicate that the RFID tag is not loaded onto the pallet mover.

In one embodiment, the time window used to monitor the change of the RSSIs of the RFID tags may be shorter than the time window used to generate the list of the RFID tags in communication with the RFID reader at block 335 of method 300. Using a longer time window to generate the list increases the likelihood the RFID reader identifies all the tags within the beam pattern or sense zone of the RFID antenna although this may mean the RFID reader detects RFID tags that are not part of the pallet loaded onto the pallet mover. The RFID controller can use the shorter time windows to monitor the RSSIs for the identified tags and cull the list to identify the RFID tags actually in the pallet or pallets on the pallet mover.

At block 415, the RFID controller determines whether at least one RSSI remains substantially constant as the pallet mover moves. If not, the method 400 proceeds to block 420 where the RFID controller determines that no pallet is currently loaded onto the pallet mover. Doing so provides a check to ensure that a pallet was actually loaded onto the pallet.

If, in contrast, at least one RSSI remains substantially constant, the method 400 proceeds to block 425 where the RFID controller determines that at least one pallet is loaded onto the pallet mover and that pallet includes the RFID tag with the constant RSSI. Stated differently, the RFID controller determines that the package containing the RFID tag (as well as the other packages in the same pallet) is loaded onto the pallet.

At block 430, the RFID controller reports the RFID tag with the constant RSSI to the inventory tracking system. In one example, the RFID controller does not identify all the RFID tags in the pallet. So long as the RFID controller identifies at least one of the packages, the RFID controller can inform the inventory tracking system. Because the package database may indicate which packages are disposed in the same pallet, the inventory tracking system can identify all the packages currently loaded onto the pallet mover. That is, the worker who built the pallet can inform the inventory tracking system what packages are in the pallet. Thus, when the RFID controller reports to the inventory tracking system that at least one of the RFID tags disposed in the pallet was identified at block 425, the inventory tracking system can determine that the other packages in the pallet are also loaded onto the pallet mover.

In one embodiment, the inventory tracking system compares the RFID tags reported by the RFID controller to an expected list of RFID tags stored in the package database which includes all the RFID tags (i.e., all the packages) that should be in the pallet. If the RFID controller reports an RFID tag that is in the pallet which is not in the expected list, the inventory tracking system can determine that a worker mistakenly included the package when building the pallet. Further, if the tags reported by the RFID controller do not include all the expected RFID tags, the inventory tracking system can alert the operator to check whether the missing package is indeed in the pallet since the package may be in the pallet but was not detected by the RFID reader.

In one embodiment, the RFID controller identifies multiple RFID tags with constant RSSIs. Although these tags may be disposed on the same pallet, in other examples the pallet mover may be capable of carrying two pallets. The RFID controller can report the RFID tag IDs to the inventory tracking system which can determine whether the pallet mover is carrying one pallet or two pallets. For example, if the package database indicates that the IDs corresponding to tags are disposed in two pallets, the inventory tracking system can determine that multiple pallets are loaded onto the pallet mover. However, if the IDs correspond to only one pallet, the inventory tracking system determines that only one pallet is loaded onto the pallet mover.

At block 435, the RFID controller receives feedback from the inventory tracking system indicating if the pallet picked up by the operator is the incorrect pallet. If the operator picked up the wrong pallet, the inventory tracking system can inform the RFID controller which can display feedback and updated instructions to the operator. If, however, the operator picked up the right pallet, the RFID controller can display positive feedback such as a green light or a check mark.

Figure 5:
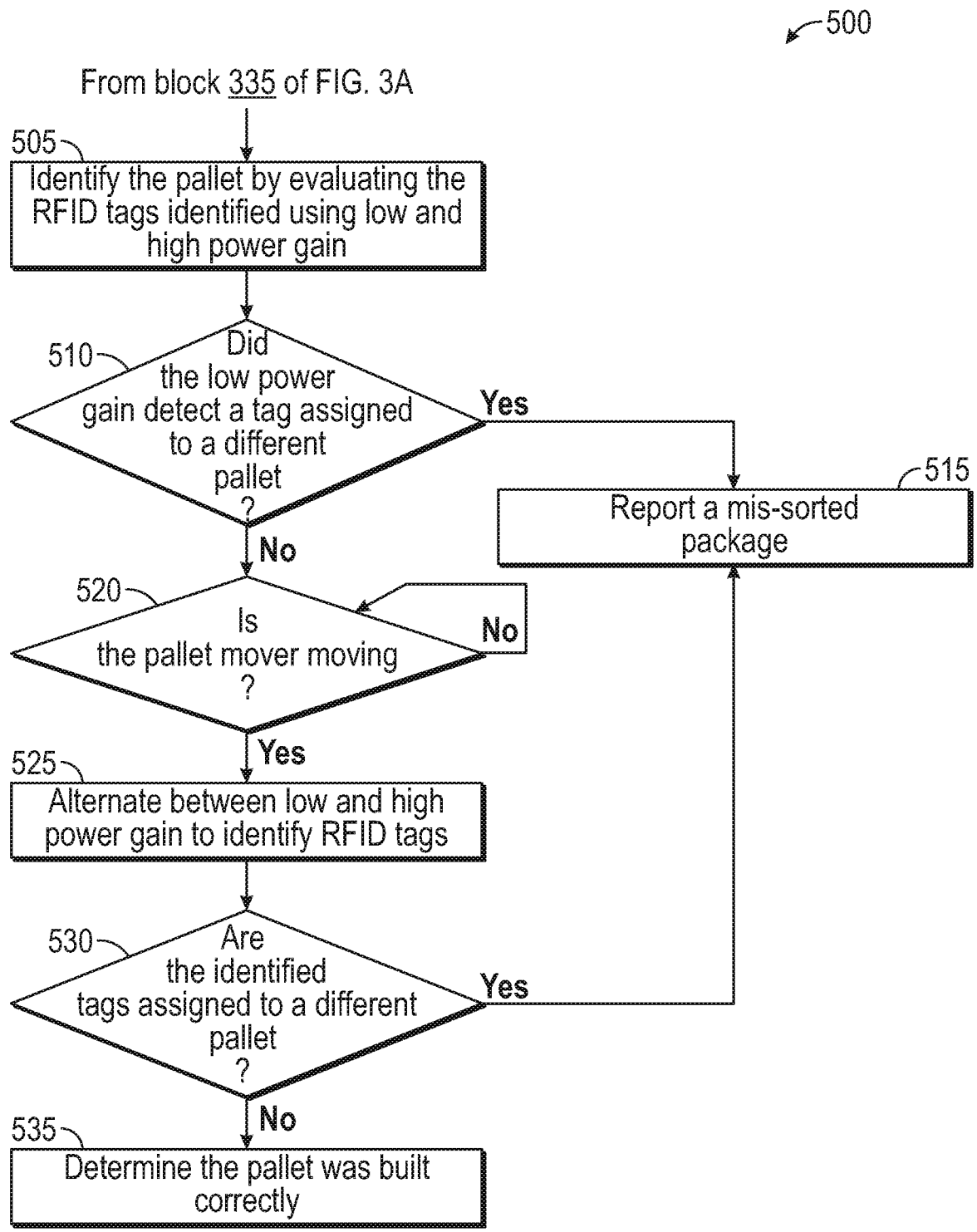
FIG. 5 is a flow chart for determining if a pallet is loaded onto a pallet mover, according to various embodiments.

FIG. 5 is a flow chart of a method 500 for determining if a pallet is loaded onto a pallet mover, according to various embodiments. Like method 400, the method 500 begins after block 335 of FIG. 3A when the RFID controller has identified RFID tags proximate to the pallet mover. At block 505, the RFID controller identifies the pallet by evaluating the RFID tags identified at blocks 320 and 330 of method 300. One advantage of using method 500 relative to method 400 to identify the pallet is that block 505 can be performed before the pallet mover has moved. That is, the RFID controller and the inventory tracking system can identify the pallet without first waiting for the pallet mover to move and then monitoring the RSSI of the identified tags.

In one embodiment, at block 505, the RFID controller transmits the list of RFID tags identified using the low and high power gains at blocks 320 and 330 of method 300 to the inventory tracking system. Using the package database, the inventory tracking system can determine if the list of RFID tags are assigned to the same pallet or different pallets. If assigned to different pallets, the inventory tracking system can resolve which of the pallets is currently loaded onto the pallet mover. In one embodiment, if the RFID tags identified using the lower power gain at block 320 are all (or substantially all) assigned to the same pallet, the inventory tracking system may determine this pallet is currently loaded onto the pallet mover, even if RFID controller identified tags on different pallets using the higher power gain at block 330. For example, if more than a predefined percentage (e.g., 90%) of the RFID tags identified at block 320 is assigned to Pallet A, the inventory tracking system determines that Pallet A is currently loaded onto the pallet mover. In another embodiment, if one or more of the RFID tags identified using the lower power gain at block 320 is assigned to different pallets in the package database (or less than the predefined percentage of tags is assigned to the same pallet), the inventory tracking system evaluates the tags identified using the high power gain at block 330 to determine which pallet is loaded onto the pallet mover. For example, the inventory tracking may identify the pallet by identifying the pallet with the most identified RFID tags. That is, if the when performing block 330 the RFID controller identifies thirty tags assigned to Pallet A but only twenty-five tags assigned to Pallet B, the inventory tracking system determines that Pallet A is currently loaded onto the pallet mover. In another embodiment, the inventory tracking system may use a confidence threshold to determine what pallet is on the mover—e.g., if over 90% of the RFID tags detected at block 330 are assigned to the same pallet. In this manner, the inventory tracking system can uniquely identify the pallet loaded onto the pallet mover without relying on movement.

Once the pallet is identified, the inventory tracking system can determine if the pallet is the correct pallet. If, however, the operator picked up the wrong pallet, the feedback module in the inventory tracking system can inform the RFID controller which can display feedback and updated instructions to the operator. Thus, in this embodiment, the inventory tracking system can determine whether the current pallet loaded on the pallet mover is the correct pallet without waiting for the pallet mover to begin moving. As a result, the inventory tracking system may provide feedback sooner to the operator which can save time when the operator picks up the wrong pallet and a corrective action needs to occur (e.g., the operator should retrieve a different pallet).

At block 510, the inventory tracking module determines if one of the RFID tags detected using the low power gain at block 320 was assigned to a different pallet. Because the inventory tracking system identified at block 505 which pallet is on the pallet mover, the inventory tracking system can determine if an RFID tag detected by the low power gain should have been placed in a different pallet. Unlike the high power gain, the low power gain of the RFID reader may be selected to detect only tags that are in a pallet loaded on the pallet mover. Thus, if at block 510, the inventory tracking module determines one of those tags should be on a different pallet, the method 500 proceeds to block 515 where the feedback module can report that the pallet includes a mis-sorted package and instruct the operator to take a remedial action—e.g., finding the mis-sorted package or moving the pallet to a different location than the previous destination. However, if when using the low power gain at block 320 the RFID reader can detect RFID tags that are not loaded onto the pallet move (i.e., the beam pattern covers more than just area directly in front of the pallet mover), the method 500 may not report mis-sorted packages after block 510 but wait until block 530 to determine if a package has been mis-sorted.

However, if the RFID tags detected using the low power gain are all (or substantially all) assigned to the same pallet, the method 500 proceeds to block 520 where the RFID controller determines if the pallet mover is moving. As described above, the location tracker can use the RTLS tag to determine if the pallet mover is currently moving and report this information to the RFID controller.

If the pallet mover is moving, at block 525, the RFID controller alternates between using the lower gain antenna or the lower power settings and the higher gain antenna or the higher power settings to read the RFID tags proximate to the pallet mover. Put differently, the RFID controller performs a similar function as performed in blocks 320 and 330 in method 300, but after or while the pallet mover is moving, in order to determine which RFID tags are identified.

Because the pallet mover is or has moved, the RFID controller can again to evaluate the RFID tags identified using the low and high power gains to identify mis-sorted packages—i.e., packages that should be in different pallets. For instance, using the RTLS tag, the location tracker can determine if the pallet mover has moved a predefined distance (e.g., more than ten yards as indicated by the RTLS tag) from where the pallet mover picked up the pallet. If, at block 530, the RFID controller continues to detect the same tags (which are assigned to a different pallet or pallets) that were detected when the pallet mover first picked up the pallet, the method 500 proceeds to block 515. However, if the tags assigned to different pallets which were detected previously are no longer detected at block 530, the method 500 proceeds to block 535 where the inventory tracking system determines the pallet was built correctly.

In another example, at block 530, the RFID controller evaluates the RFID tags identified using the lower power gain to see if the list of identified tags has changed relative to the tags detected when the pallet was picked up. For example, a worker may have walked by the pallet mover carrying a package that was picked up by the lower gain antenna when performing block 320 of method 300. The RFID controller may wait a predefined time before performing block 530 to provide sufficient time for the pallet mover to move away from the pickup location or for transient packages to leave the range of the low gain antenna. If the RFID tag is no longer detected using the low gain power at block 525, the feedback module can determine that the package is not in the currently loaded pallet.

In one embodiment, the RFID controller may also switch to the method 400 where the RFID controller monitors the RSSIs of the RFID tags to determine if at least one of the RSSIs remains substantially constant as the pallet mover moves in order to determine if the identified tags are in the pallet currently on the pallet mover or not. Monitoring the RSSIs can be used as a check to ensure that the detected RFID tags are indeed disposed on the currently loaded pallet.

Figure 6:
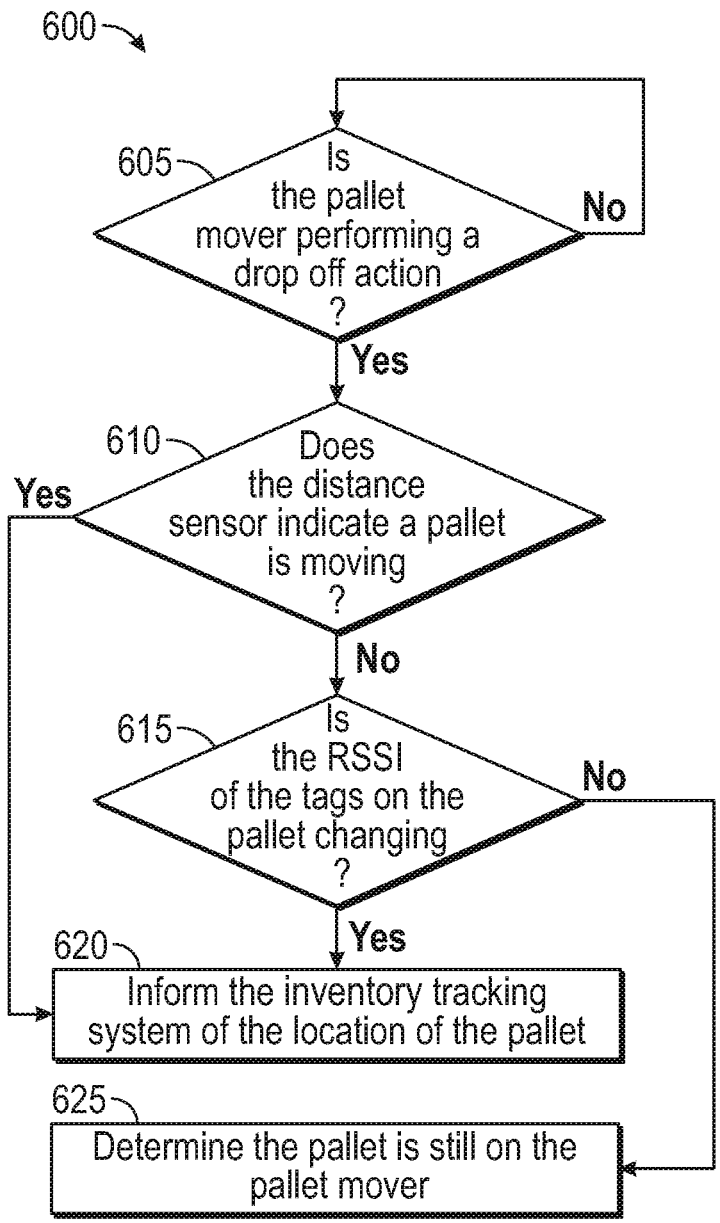
FIG. 6 is a flow chart for determining the location of a pallet after being dropped off by a pallet mover, according to various embodiments.

FIG. 6 is a flow chart of a method 600 for determining the location of a pallet after being dropped off by a pallet mover, according to various embodiments. In one embodiment, the method 600 starts only after the RFID controller or the inventory tracking system determines that the pallet mover has picked up a pallet. At block 605, the RFID controller determines if the pallet mover performs a drop off action. In one embodiment, the RFID controller monitors the motion detector on the pallet mover to determine if the forks of the pallet mover are being lowered. For example, an accelerometer mounted on the forks may detect an downward acceleration indicating the operator has dropped the forks in order to drop off the pallet. In another example, the RFID controller may receive a message from the mover control system indicating the user has pressed a button to lower the forks. In still another example, the pallet mover may include a sensor disposed on a lever of a pallet jack which is used to lower the forks when pulled.

Once the drop off action is detected, the method 600 proceeds to block 610 where the RFID controller determines if a distance sensor indicates the pallet is moving relative to the pallet mover. That is, the pallet mover may include a distance sensor (e.g., a depth sensor or a laser sensor) which is mounted on the pallet mover to face the loaded pallet. If the operator is dropping off the pallet, the pallet mover will move away from the pallet as the forks are slid out from underneath the pallet. This movement away from the pallet can be detected by the distance sensor to verify that the operator is dropping off the pallet.

If so, the method 600 proceeds to block 620 where the RFID controller informs the inventory tracking system of the location of the pallet. That is, the RFID controller can forward to the inventory tracking system the location calculated by the location tracker which represents the location of the pallet. In one embodiment, the RFID controller can transmit the location calculated by the location tracker before the distance sensor indicated the pallet was moving away from the distance sensor—i.e., when the pallet was still loaded onto the forks—since that location may more accurately represent the location of the pallet before the pallet mover moved in order to remove the forks from underneath the pallet.

In one embodiment, the location tracker uses an offset when calculating the location of the pallet. The location tracker can use the offset to adjust the location of the RTLS tag in the pallet move to more accurately reflect the location of the pallet. In one example, the location tracker uses a motion sensor (e.g., an accelerometer) in the pallet mover to determine a direction the pallet mover is facing (e.g., north, south-west, east, etc.). For example, the RFID controller can use the direction the pallet mover is facing when the pickup action is detected to calibrate the accelerometer. In one embodiment, the display on the pallet mover can output which direction the accelerometer has determined the pallet mover is facing which permits the operator to change the direction if the direction is incorrect. The RFID controller can then monitor the output of the accelerometer to continually update the direction the pallet mover is facing as the mover moves in the warehouse. Once the distance sensor detects the pallet is being dropped off, the location tracker can use the direction faced by the pallet mover to generate an offset distance used to adjust the location of the RTLS tag to more accurately reflect the location of the dropped off pallet.

In another embodiment, the distance sensors can generate the distance offset between the RTLS tag and the pallet. For example, the distance sensor can be a time of flight sensor that measures the time needed for an emitted laser to reflect off the pallet and return to the sensor. The time of flight sensor can convert the time into an offset distance between the sensor and the pallet. The location tracker can use this offset to adjust the location of the RTLS tag to better represent the location of the pallet in the warehouse.

As mentioned above, the inventory tracking system can use the location provided by the location tracker to update the location of the packages in the pallet stored in the package database. Moreover, the inventory tracking system can update an inventory map which indicates the locations of the pallets in the warehouse. In one embodiment, if the location of the pallet reported at block 620 is not the desired destination of the pallet, the inventory tracking system can provide feedback to the operator. For example, if the operator dropped the pallet at the wrong staging area or loading dock, the inventory tracking system can send an alert that is displayed to the operator to indicate the pallet was dropped off at the wrong location and provide a map or other instructions indicating the correct destination for the pallet.

In another embodiment, after determining a pallet is loaded onto the pallet mover, the RFID controller can send location updates to the inventory tracking system before the RFID controller determines using method 600 that the pallet has been dropped off. Stated differently, the location tracker can provide updated locations which are used to track the pallet while in transit. For example, if the destination is a truck docked at a loading bay, the inventory tracking system can, at intervals, track the moving pallet to ensure the pallet mover moves through the correct loading dock such that the pallet is loaded into the correct truck. In this example, the inventory tracking system can send an alert to the operator when the pallet mover moves through the incorrect loading dock and before the operator has dropped off the pallet in the truck. In this manner, the inventory tracking system can provide alerts earlier, and thus, the operator does not need to wait until the pallet is unloaded before being informed she has moved the pallet onto the wrong truck.

Returning to block 610, if the distance sensor determines the pallet is not moving (but a drop off action was detected), the method proceeds to block 615 where the RFID controller determines if the RSSI of the tags in the pallet is changing. For example, the pallet mover may be carrying two pallets and may have performed a drop off action to drop off the pallet disposed furthest from the point where the forks attach to the pallet mover. Because the pallet closest to the base of the forks (which is not being dropped off) may block the distance sensor for viewing the pallet being dropped off, the RFID controller can instead use changes in the RSSI to determine when a pallet is being dropped off. In this case, the RSSI of a RFID tag on the pallet further away begins to change as the pallet mover slides its forks from underneath the pallet. For example, the RFID controller can monitor the average RSSI of the RFID tags, and when determining that the average changes above a threshold, the method proceeds to block 620 where the RFID controller can indicate to the inventory tracking system that the pallet corresponding to the RFID tag with the changing RSSI has been dropped off. In one example, the location tracker may calculate a specialized distance offset using the techniques described above to determine the relative distance of the dropped off pallet and the RTLS tag.

If, however, none of the RSSIs corresponding to the RFID tags carried by the pallet mover change, the method 600 proceeds to block 625 where the RFID controller determines that the pallet is still on the pallet mover. In one embodiment, the RFID controller may display a prompt to the operator asking her to confirm if a pallet was dropped off.

In one embodiment, if the pallet mover does not include a distance sensor, the method 600 can be modified such that after the drop off action is detected at block 605, the method 600 proceeds directly to block 615 to determine if the RSSI of the tags is changing thereby indicating the pallet is being dropped off. If so, the method proceeds to block 620. In yet another embodiment, the method 600 can be modified such that both blocks 605 and 610 are omitted and the RFID controller relies solely on a change in RSSI to determine when the operator is dropping off the pallet.

Figure 7:
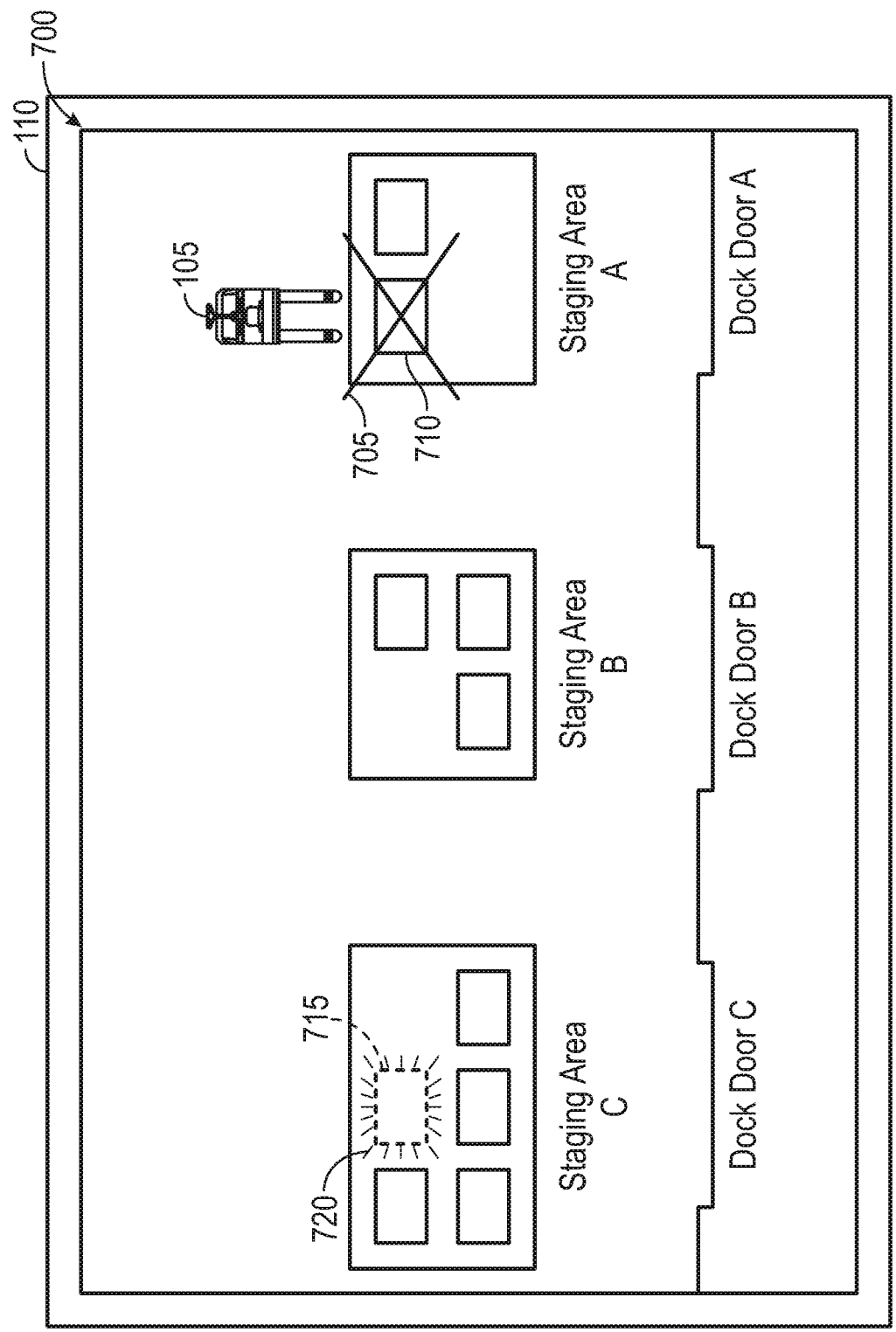
FIG. 7 is a display outputting feedback to an operator of a pallet mover, according to various embodiments.

FIG. 7 illustrates the display 110 outputting feedback to an operator of a pallet mover using a warehouse map 700, according to various embodiments. In one embodiment, the inventory tracking system instructs the display 110 to output the map 700 when at block 620 the system determines that the operator dropped off a pallet 710 at an incorrect location. However, the map 700 can provide feedback to the operator in other situations such as when the operator picks up the incorrect pallet, when the pallet mover carries a pallet through the incorrect dock door or into the wrong truck, or when the operator should move the pallet to a different destination after the inventory tracking system determines the pallet is missing packages or includes packages that should be on a different pallet (i.e., mis-sorted items).

As shown, the warehouse map 700 illustrates different structures and areas in the warehouse such as staging areas and dock doors. Based on the location provided by the RTLS tag, the map 700 can place an icon representing the pallet mover 105 at its current location in the warehouse. Moreover, using the method 600, the RFID controller can determine the location of the dropped off pallet 710 in the warehouse. In turn, the feedback module in the inventory tracking system can update an icon in the warehouse map 700 to illustrate that the pallet 710 was dropped off in Staging Area A. However, the package database may indicate that the correct location of the dropped off pallet 710 is Staging Area C. That is, the operator dropped the pallet 710 off at the wrong location.

In response, the warehouse map 700 displays an error indicator 705 corresponding to the dropped off pallet 710. In this example, the error indicator 705 is an "X" displayed over the icon representing the dropped off pallet 710. In other examples, the map 700 can make the icon flash red or display text explaining that the current location of the pallet 710 is incorrect.

The map 700 also displays the correct location 715 for the pallet 710. In this example, the pallet 710 should be dropped off at Staging Area C. In addition, the map 700 includes highlighting 720 which can aid to operator to quickly identify the correct location 715 in the map 700. For example, the highlighting 720 can be a bright colored outline of the correct location 715, a flashing indicator, one or more arrows pointing at the correct location 715, and the like. In this manner, the operator can quickly determine the pallet 710 is at an incorrect location and identify, using the map 700, the correct location 715 for the pallet 710 thereby minimizing the amount of time needed to correct the mistake.

In one embodiment, the warehouse map 700 provides a path between the current location of the pallet 710 and the correct location 715. Because the feedback module may know the current locations of all the RFID tagged pallets in the warehouse, as well as the structures in the warehouse, the feedback module can calculate the path the operator should traverse to avoid these objects and move the pallet 710 to the correct location 715. In one embodiment, the map 700 can provide real-time feedback as the operator moves the pallet 710 to the correct location 715. That is, the feedback module updates the map 700 as the location of the pallet mover 105 changes so that the operator can see the icon representing the pallet mover 105 moving to the correct location 715 and ensure she is following the path.

In one embodiment, the path may be displayed only when the correct location 715 of the pallet 710 is not shown on the map. That is, in some examples if the map 700 were zoomed out to include both the current location of the pallet 710 and the correct location 715, the details of the features and the structures in the warehouse may be too small for the operator to identify where the correct location 715 is in the warehouse. In that case, the map 700 may zoom in to show the current location of the pallet 710 (but not the correct location 715) and output the path which the operator can follow to eventually get to the correct location 715. As mentioned above, the feedback module can update the map 700 as the operator traverses the path. In another embodiment, if the current location and the correct location 715 are too far apart to be displayed simultaneously in the map 700, the feedback module can provide directions to the operator using text or audio.

Figure 8:
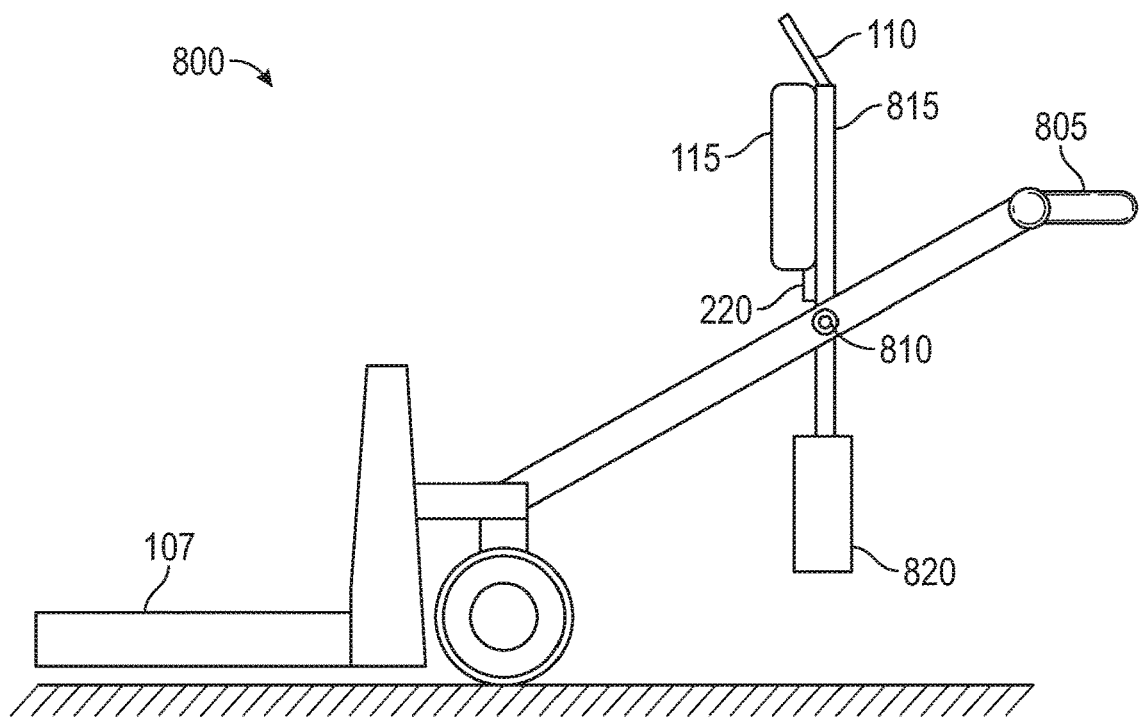
FIG. 8 is a pallet mover with a pivoting RFID system, according to various embodiments.

FIG. 8 is a pallet jack 800 with a pivoting RFID system, according to various embodiments. The pallet jack 800 includes a lever 805 which is mounted at an angle to the fork 107. The operator can use the lever 805 to push and pull the pallet jack 800. In one embodiment, the operator pumps the lever 805 up and down which lifts the fork 107 to load a pallet onto the pallet jack 800.

Because of the offset angle between the fork 107 and the lever 805 shown here, mounting the RFID antenna 115 flush with the lever 805 causes the antenna 115 to face away from a pallet loaded onto the fork 107. As a result, the RFID signals emitted and received from the antenna 115 may not be focused onto the pallet. A similar problem occurs if the distance sensor 220 is mounted flush on the lever 805.

Instead, the RFID antenna 115 and the distance sensor 220 are mounted onto the lever 805 using a pivot 810 and a support 815. In this example, the RFID antenna 115, the distance sensor 220, and the display 110 are mounted on a portion of the support 815 that is above the pivot 810 while a counterweight 820 is mounted on the support 815 below the pivot 810. In one embodiment, the counterweight 820 is heavier than the combined weight of the components mounted to the portion of the support above the pivot 810. That way, gravity ensures that the support is perpendicular to the floor of the warehouse which in turn aligns the RFID antenna 115 and the distance sensor 220 to face a pallet that is loaded onto the fork which can increase the ability of the RFID antenna to transmit signals to, and receive signals from, RFID tags in the pallet as well as the ability of the distance sensor 220 to detect when a pallet is loaded onto and off the pallet jack 800. As the operator raises or lowers the lever 805, the support 815 can pivot freely to remain perpendicular to the ground which keeps the RFID antenna 115 and the distance sensor 220 aligned in the optimal direction.

In one embodiment, although not shown, the counterweight 820 can include the RFID reader, the motion sensor, RTLS tag, the controller hardware, and any additional weight to ensure the counterweight 820 weighs more than the components mounted to the portion of the support 815 above the pivot 810.

Figure 9:
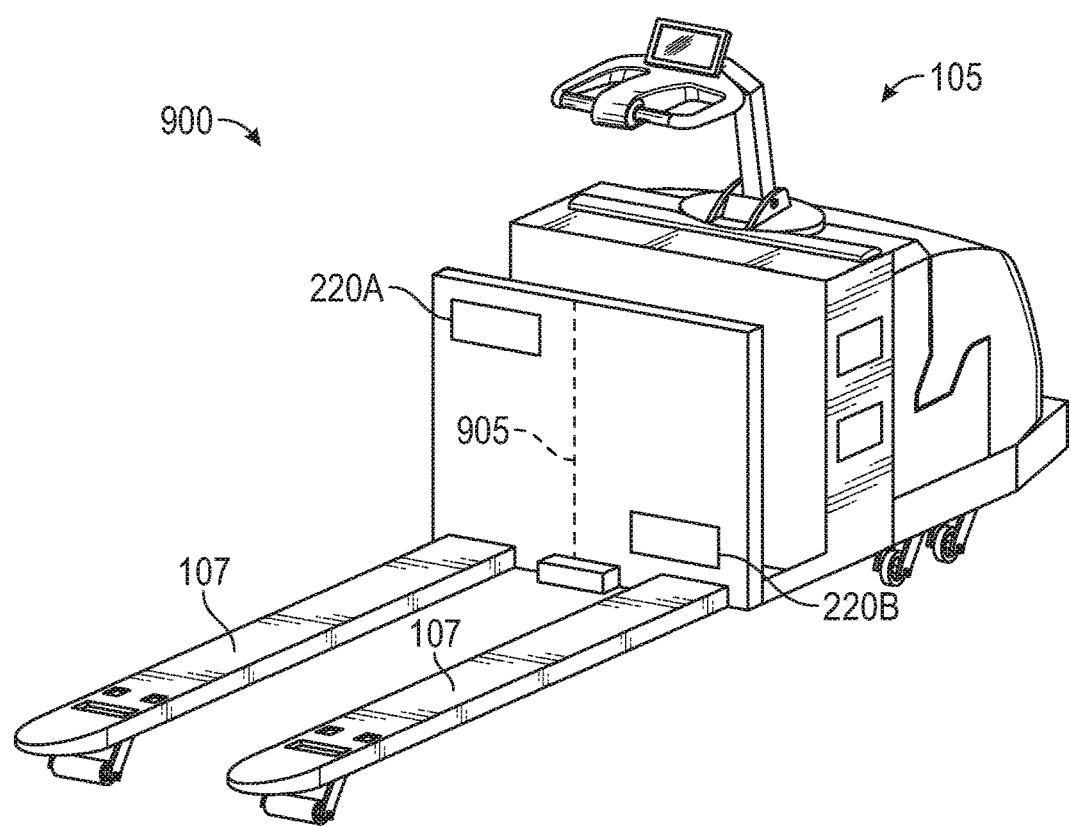
FIG. 9 is an antenna arrangement on a pallet mover, according to various embodiments.

FIG. 9 is an antenna arrangement 900 on a pallet mover 105, according to various embodiments. As shown, the pallet mover 105 includes two RFID antennas 220A and 220B. To improve spatial diversity, the RFID antennas 220A and 220B are spaced different distances from the forks 107 and the ground. Moreover, the RFID antennas 220A and 220B are offset from each other relative to a vertical axis 905 which is perpendicular to the ground. Put differently, the center of the RFID antennas 220A and 220B are not disposed along the same vertical axis 905. This antenna arrangement 900 may increase the ability of the antennas, when operating in parallel, to detect RFID tags in a pallet loaded onto the forks 107 relative to using only one antenna or using two antennas in parallel that are disposed at the same height or whose centers fall along the same vertical axis 905.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be used to implement embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A pallet mover, comprising:
    a support member for transporting a first pallet and a second pallet;
    a radio frequency identification (RFID) antenna;
    an RFID reader coupled to the RFID antenna and configured to identify a first RFID tag proximate to the pallet mover;
    a distance sensor configured to determine a separation distance from the distance sensor to the first pallet;
    a real-time location system (RTLS) tag; and
    a controller configured to:
        determine that the pallet mover is moving based on signals received from the RTLS tag;
        monitor a first received signal strength indicator (RSSI) corresponding to the first RFID tag using the RFID reader after determining the pallet mover is moving;
        determine that the first RSSI of the first RFID tag is substantially constant, according to a predefined threshold, while the pallet mover is moving;
        determine that the first RFID tag is disposed on the first pallet loaded onto the pallet mover based on the first RSSI;
        report the first RFID tag to an inventory tracking system while the first pallet is loaded onto the pallet mover; and
        receive feedback to the reported first RFID tag from the inventory tracking system indicating the first pallet is at an incorrect location;
        monitor a second RSSI corresponding to a second RFID tag on the second pallet when the pallet mover is moving; and
        determine, based on the second RSSI and the separation distance, that the second pallet was removed from the pallet mover during a drop off action and that the first pallet remains loaded on the pallet mover after the drop off action.

2. The pallet mover of claim 1, wherein the controller is configured to determine that the RSSI has changed, according to the predefined threshold, when the pallet mover is moving, wherein determining that the second pallet was removed is in response to determining that the second RSSI has changed.

3. The pallet mover of claim 1, wherein the controller is configured to determine, using a plurality of locations derived from the signals received by the RTLS tag, when the pallet mover is moving, wherein determining that the first RSSI of the first RFID tag is substantially constant is performed only after determining the pallet mover is moving using the plurality of locations.

4. The pallet mover of claim 3, wherein the controller is configured to activate the RFID reader from an inactive state to identify the first RFID tag proximate to the pallet mover only after determining the pallet mover is moving using the plurality of locations.

5. The pallet mover of claim 3, further comprising a motion sensor, wherein the controller is configured to, after determining that the first RSSI of the first RFID tag is substantially constant, detect the drop off action used to remove the first pallet containing the first RFID tag from the support member based on a signal provided by the motion sensor, wherein a location of the first RFID tag is reported to the inventory tracking system after detecting the drop off action and determining the pallet mover is moving using the plurality of locations.

6. A system mountable to a pallet mover configured to carry a first pallet and a second pallet, the system comprising:
an RFID antenna;
an RFID reader coupled to the RFID antenna and configured to identify a first RFID tag proximate to the pallet mover;
a distance sensor configured to determine a separation distance from the distance sensor to the first pallet;
a RTLS tag; and
a controller configured to:
monitor a relative distance between the first RFID tag and the pallet mover when the pallet mover is moving;
determine that the relative distance between the first RFID tag and the pallet mover is substantially constant according to a predefined threshold;
report a location of the first RFID tag to an inventory tracking system while the first pallet is loaded onto the pallet mover, wherein the location is derived from signals received by the RTLS tag;
receive feedback to the reported location of the first RFID tag from the inventory tracking system indicating the first pallet is at an incorrect location;
monitor an RSSI corresponding to a second RFID tag on the second pallet when the pallet mover is moving; and
determine, based on the RSSI and the separation distance, that the second pallet was removed from the pallet mover during a drop off action and that the first pallet remains loaded on the pallet mover after the drop off action.

7. The system of claim 6, wherein the controller is configured to:
determine that the pallet mover has moved by comparing a previous location of the pallet mover from a current location of the pallet mover, wherein the previous and current locations are derived from signals received by the RTLS tag; and
activate the RFID reader from an inactive state to identify the first RFID tag.

8. The system of claim 6, wherein the controller is configured to:
determine that the pallet mover has performed a pickup action by monitoring a sensor configured to output a signal corresponding to lifting forks on the pallet mover; and
activate the RFID reader from an inactive state to identify the first RFID tag.

9. The system of claim 6, further comprising a display, wherein the controller is configured to output, using the display, instructions for an operator of the pallet mover based on the feedback.

10. The system of claim 6, further comprising a motion sensor, wherein the controller is configured to:
determine that the first pallet is loaded onto the pallet mover based on the relative distance; and
detect the drop off action used to remove the second pallet based on a signal provided by the motion sensor, wherein the location of the first RFID tag is reported to the inventory tracking system after detecting the drop off action.

11. The system of claim 10, further comprising a display, wherein the controller is configured to:
receive feedback from the inventory tracking system when the reported location of the first RFID tag does not match a desired destination of the first pallet; and
output, using the display, instructions for an operator of the pallet mover to perform a remedial action based on the feedback.

12. The system of claim 6,
wherein the controller is configured to detect a second drop off action of the first pallet based on the separation distance, wherein the location of the first RFID tag is reported to the inventory tracking system after detecting the second drop off action.

* * * * *